(12) United States Patent
Chen (10) Patent No.: US 10,053,185 B1
(45) Date of Patent: Aug. 21, 2018

(54) BICYCLE CRANKSET WITH ECCENTRIC CHAINRING

(71) Applicant: DRIVETRAIN TECH SOLUTION INC., Taichung (TW)

(72) Inventor: Po-Cheng Chen, Taichung (TW)

(73) Assignee: Drivetrain Tech Solution Inc., Taichung (TW)

( * ) Notice: Subject to any disclaimer, the term of this patent is extended or adjusted under 35 U.S.C. 154(b) by 0 days.

(21) Appl. No.: 15/616,464

(22) Filed: Jun. 7, 2017

(51) Int. Cl.
  *B62M 9/08* (2006.01)
  *B62M 3/06* (2006.01)
  *B62M 1/36* (2013.01)
  *B62M 9/00* (2006.01)

(52) U.S. Cl.
  CPC ............... *B62M 9/08* (2013.01); *B62M 1/36* (2013.01); *B62M 3/06* (2013.01); *B62M 9/085* (2013.01); *B62M 2009/002* (2013.01)

(58) Field of Classification Search
  CPC .......... B62M 3/06; B62M 9/08; B62M 9/085; B62M 2009/002; B62M 1/36; B62M 3/00; B62M 9/105; B62M 2003/006
  USPC ........................ 74/594.3, 594.2; 474/56, 57
  See application file for complete search history.

(56) References Cited

U.S. PATENT DOCUMENTS

| | | | |
|---|---|---|---|
| 6,895,834 B1 * | 5/2005 | Baatz | B62M 3/02 280/259 |
| 7,749,117 B2 | 7/2010 | Carrasco Vergara | |
| 2007/0054769 A1 * | 3/2007 | Hunter, Jr. | B62M 3/00 474/160 |

FOREIGN PATENT DOCUMENTS

TW  I399322 B1  6/2013

* cited by examiner

*Primary Examiner* — Patrick D Cicchino
(74) *Attorney, Agent, or Firm* — Wang Law Firm, Inc.

(57) ABSTRACT

A bicycle crankset, which is adapted to connect to a chain, includes a chainring and a crankarm. The chainring has a plurality of teeth, a plurality of connecting bores of first noncircular motion path, and a plurality of connecting bores of circular motion path. The crankarm has a plurality of connecting arms to be selected to secured to the connecting bores of first noncircular motion path or the connecting bores of circular motion path. The chainring provides a first noncircular path of motion when the connecting arms of the crankarm are secured to the connecting bores of first noncircular motion path, and chainring provides a circular path of motion when the connecting arms of the crankarm are secured to the connecting bores of circular motion path.

4 Claims, 9 Drawing Sheets

BICYCLE CRANKSET WITH ECCENTRIC CHAINRING

BACKGROUND OF THE INVENTION

1. Technical Field

The present invention relates to a bicycle, and more particularly to a bicycle crankset with an eccentric chainring.

2. Description of Related Art

Typically, a bicycle is provided with a round chainring and a pair of crankarms connected to the chainring through a spider. A rider steps pedals of the crankarms to turn the chainring, so as to drive the bicycle forward. However, a motion of the crankarms is round, and a motion of feet of the rider is up and down. Therefore, lots of the power transmitted from rider's feet to the crankarms will be lost.

When a rider is stepping on the crankarms, the power is positive when the rider steps the crankarms downward, and the power is maximum when the crankarm is moved to a horizontal position. After the lowest position, the power is negative which does not help move the bicycle.

The modern bicycle provides an elliptical chainring to solve this problem. Taiwan patent no. 1399322 disclosed a bicycle chainring with different radiuses. This chainring provides different arms of force according to the position of the crankarm to improve the efficiency of stepping the crankarms.

U.S. Pat. No. 7,749,117 disclosed an elliptical chainring. The chainring is adjustable according to its position and shape to meet various needs of different riders. This patent also provides the chainring with the parameters the same as a normal chainring at the region when the rider is stepping downward to reduce the loading of knees.

BRIEF SUMMARY OF THE INVENTION

In view of the above, the primary objective of the present invention is to provide a bicycle crankset, which is adjustable for its motion to obtain high torque output and high power efficiency.

In order to achieve the objective of the present invention, a bicycle crankset, which is adapted to connect to a chain, includes a chainring and a crankarm. The chainring has a round circumference and a plurality of teeth on the circumference to engage the chain. The chainring has a chainring center, which is a center of the circumference, and a connecting portion. The chainring has a plurality of connecting bores of first noncircular motion path on the connecting portion, wherein the connecting bores of first noncircular motion path have a center of rotation, and the center of rotation of the connecting bores of first noncircular motion path is kept a distance from the chainring center. The chainring has a plurality of connecting bores of circular motion path on the connecting portion, wherein the connecting bores of circular motion path have a center of rotation, and a location of the center of rotation of the connecting bores of circular motion path is the same as the chairing center. The crankarm has a plurality of connecting arms at an end thereof, and an axial bore at the end having the connecting arms, wherein the crankarm has a center of rotation at a center of the axial bore, each of the connecting arms has a bore, and distances between center of the bores and the center of rotation of the crankarm are the same. The connecting arms of the crankarm are selected to be secured to the connecting bores of first noncircular motion path or the connecting bores of circular motion path of the chainring; the chainring provides a first noncircular path of motion when the connecting arms of the crankarm are secured to the connecting bores of first noncircular motion path, and chainring provides a circular path of motion when the connecting arms of the crankarm are secured to the connecting bores of circular motion path.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
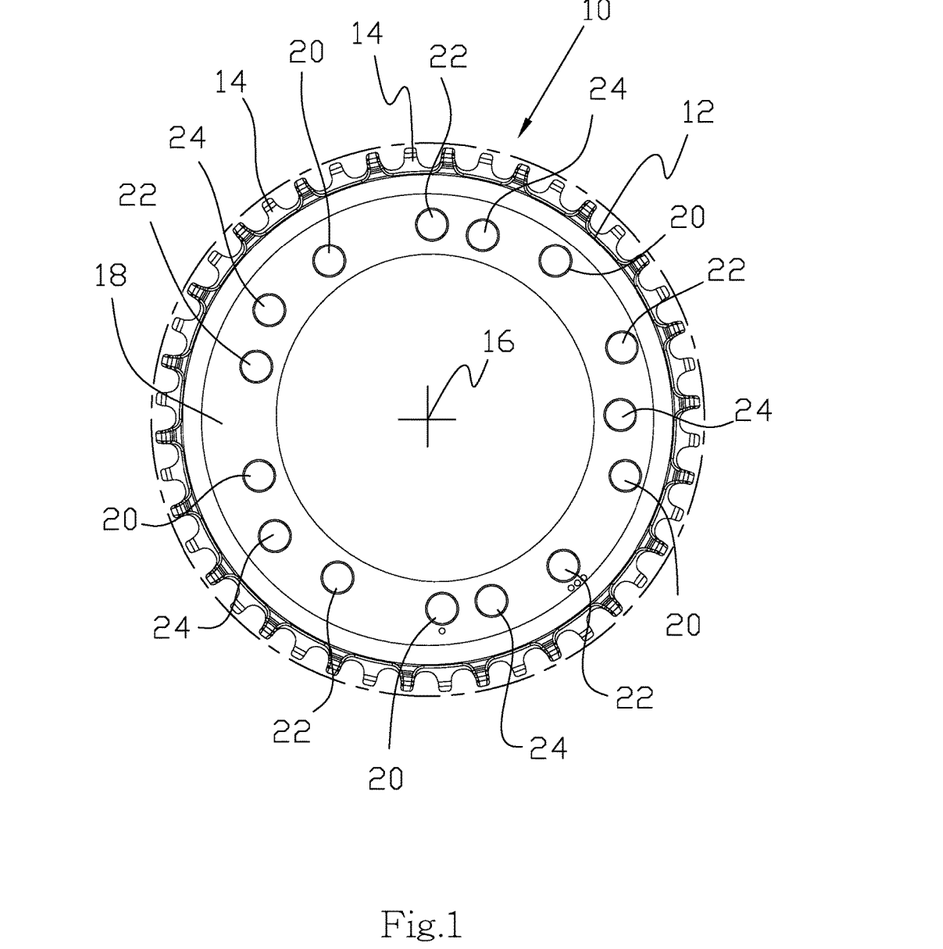
FIG. 1 is a front view of the chainring of a preferred embodiment of the present invention.

FIG. 1 shows a bicycle crankset of the preferred embodiment of the present invention, including a chainring 10. The chainring 10 has a round circumference 12 and a plurality of teeth 14 on the round circumference 12. A center of the round circumference 12 is defined as a chainring center 16. The chainring 10 has an annular connecting portion 18 behind the teeth 14.

The chainring 10 is provided with a plurality of connecting bores 20 of first noncircular motion path on the connecting portion 18. In order to provide a noncircular path of motion, distances between centers of the connecting bores 20 of first noncircular motion path and the chainring center 16 are different. In other words, the connecting bores 20 of first noncircular motion path has a center of rotation, and the center of rotation of the connecting bores 20 of first noncircular motion path is kept a distance from the chainring center 16.

The chainring 10 is provided with a plurality of connecting bores 22 of second noncircular motion path on the connecting portion 18. In order to provide another noncircular path of motion, distances between centers of the connecting bores 22 of second noncircular motion path and the chainring center 16 are different. In other words, the connecting bores 22 of second noncircular motion path has a center of rotation, and the center of rotation of the connecting bores 22 of second noncircular motion path is kept a distance from the chainring center 16, and also kept a distance from the center of rotation of the connecting bores 20 of first noncircular motion path.

The chainring 10 is provided with a plurality of connecting bores 24 of circular motion path on the connecting portion 18. The connecting bores 24 are on a circumference, and a center of the circumference is the same as the chainring center 16.

Figure 2:
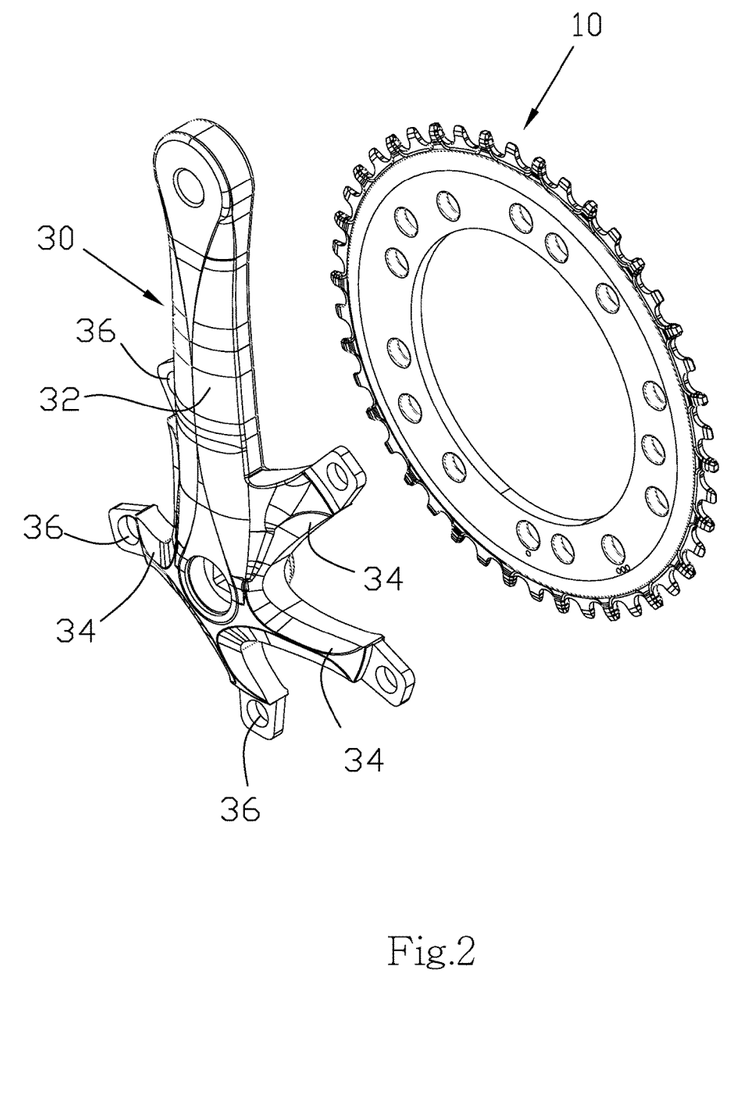
FIG. 2 is an exploded view of the preferred embodiment of the present invention.
Figure 3:
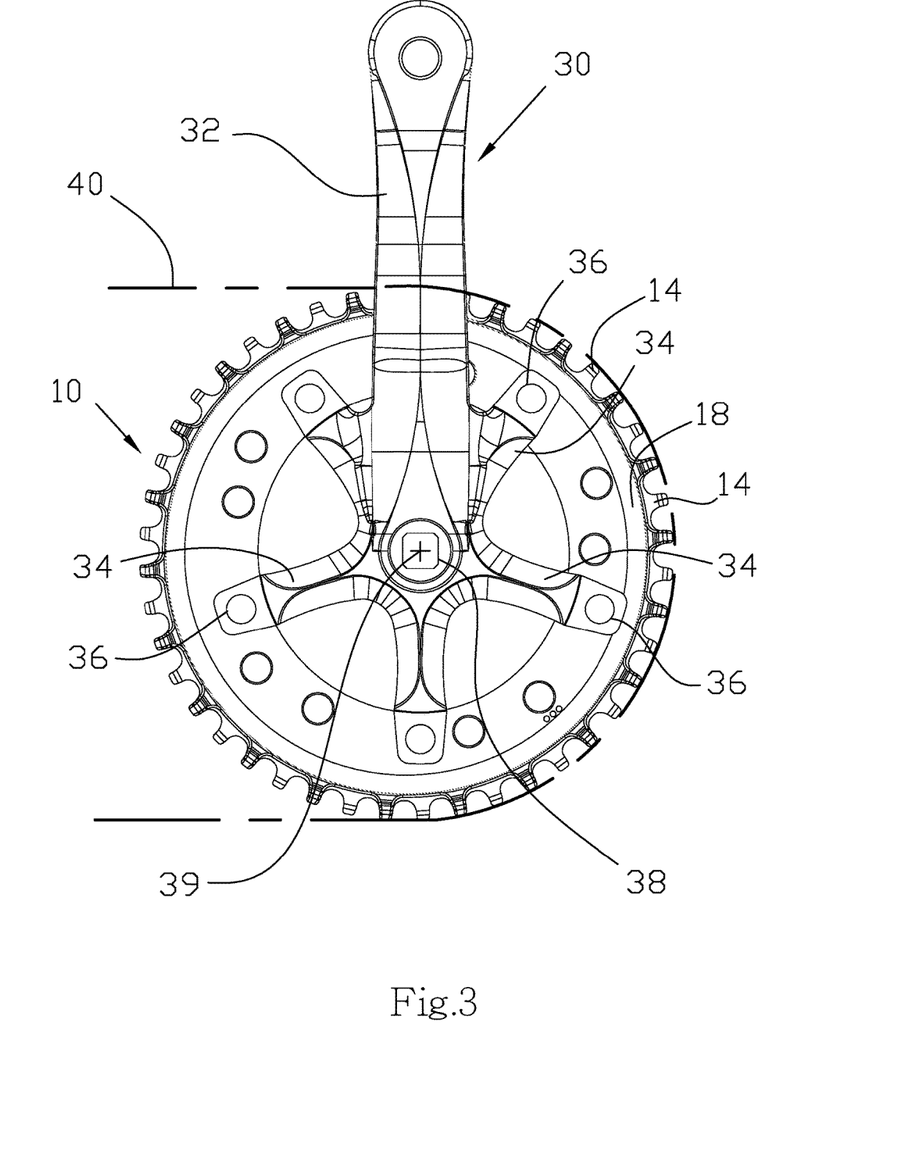
FIG. 3 is a front view of the preferred embodiment of the present invention.

As shown in FIGS. 2 and 3, the bicycle crankset of the preferred embodiment of the present invention further includes a crankarm 30 connected to the chainring 10. The crank 30 has five connecting arms 34, each of which has a bore 36 adjacent to a distal end thereof.

As shown in FIG. 3, the crankarm 30 has an axial bore 38 at the end connected to the connecting arms 30. A center of the axial bore forms a center of rotation 39 of the crankarm 30. Distances between the center of rotation 39 and the bores 36 of the connecting arms 34 are the same.

The connecting arms 34 of the crankarm 30 are selected to be secured to the connecting bores 20 of first noncircular motion path, the connecting bores 22 of second noncircular motion path, or the connecting bores 24 of circular motion path. A chain 40 engages the teeth 14 of the chainring 10. A bracket axle has an end connected to the axial bore 38 of the crankarm 30, and an opposite end is connected to another crankarm (not shown). A rider steps the crankarm 30 to rotate the chainring 10.

Figure 4:
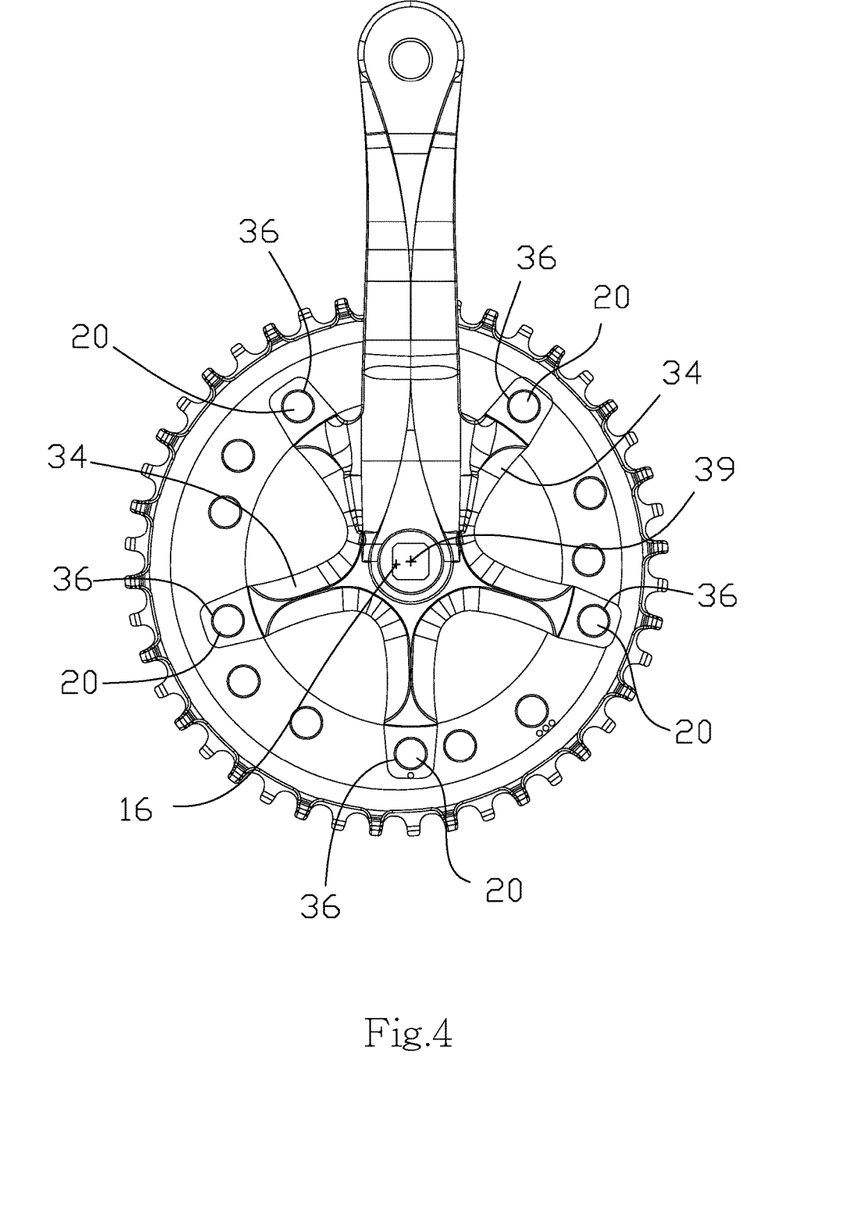
FIG. 4 is a front view of the preferred embodiment of the present invention, showing the crankarm connected to the connecting bores of first noncircular motion path.

As shown in FIG. 4, if the connecting arms 34 of the crankarm 30 are secured to the connecting bores 20 of first noncircular motion path of the chainring 10, the center of rotation 39 of the crankarm 30 is kept a first distance from the chainring center 16 to make the chainring 10 provide a first noncircular path of motion.

Figure 5:
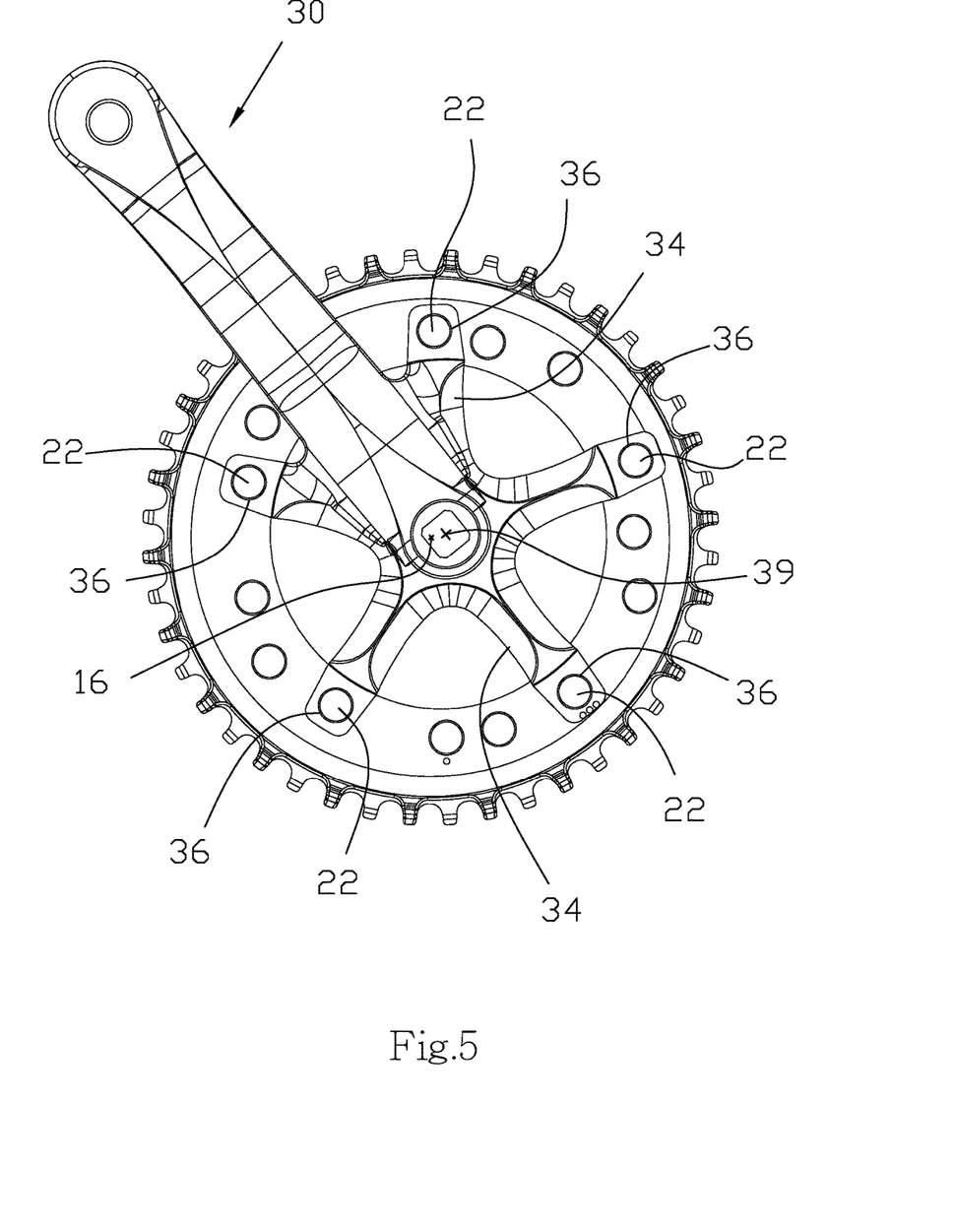
FIG. 5 is a front view of the preferred embodiment of the present invention, showing the crankarm connected to the connecting bores of second noncircular motion path.

As shown in FIG. 5, if the connecting arms 34 of the crankarm 30 are secured to the connecting bores 22 of second noncircular motion path of the chainring 10, the center of rotation 39 of the crankarm 30 is kept a second distance from the chainring center 16 to make the chainring 10 provide a second noncircular path of motion.

In comparison of FIG. 4 and FIG. 5, a direction and a distance between the center of rotation 39 and the chainring center 16 when the connecting arms 34 of the crankarm 30 are secured to the connecting bores 20 of first noncircular motion path of the chainring 10 are not the same as that when the connecting arms 34 of the crankarm 30 are secured to the connecting bores 22 of second noncircular motion path of the chainring 10. Therefore, the first noncircular path of motion of the chainring 10 is different from second noncircular path of motion of the chainring 10.

Figure 6:
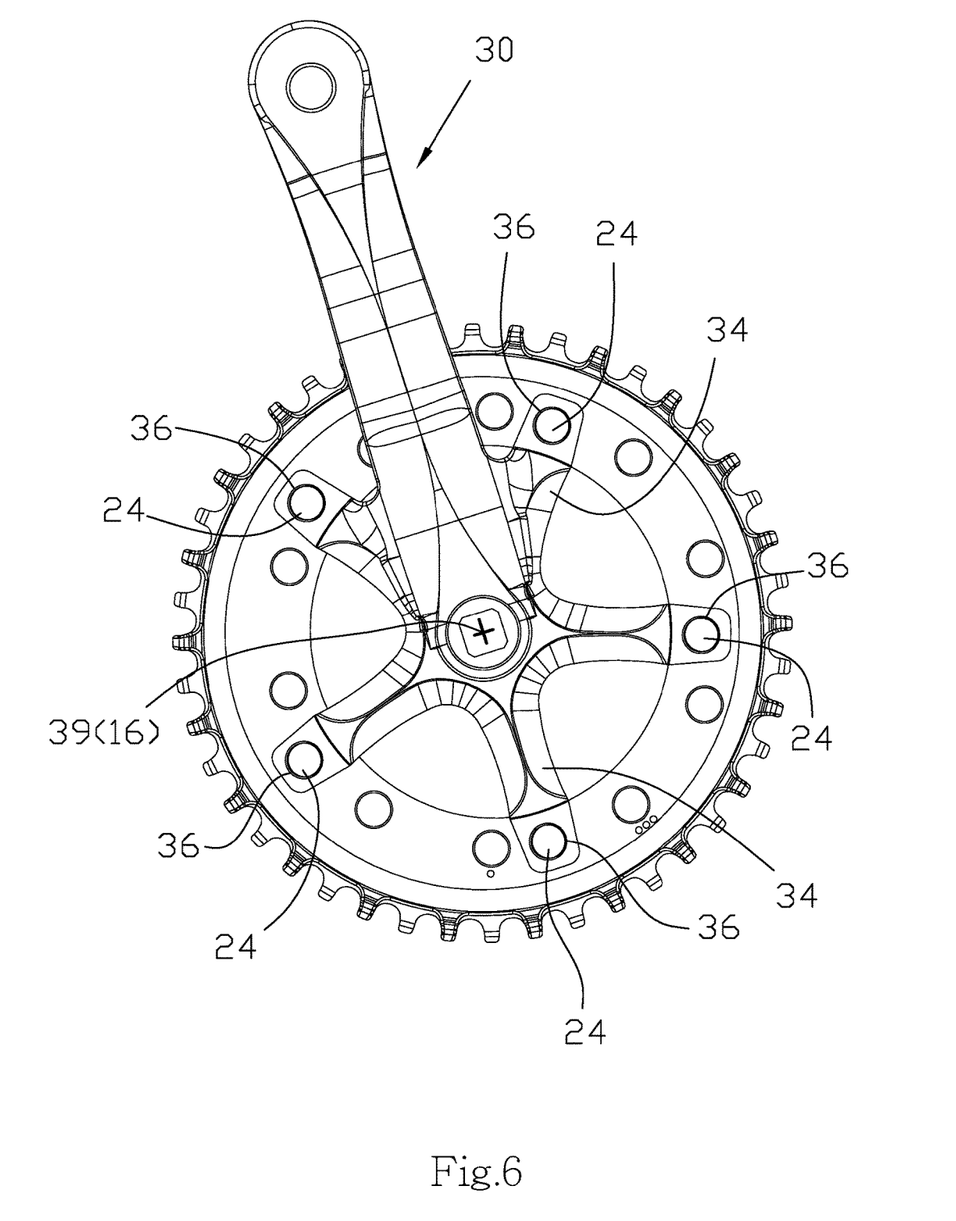
FIG. 6 is a front view of the preferred embodiment of the present invention, showing the crankarm connected to the connecting bore of round motion path.

As shown in FIG. 6, if the connecting arms 34 of the crankarm 30 are secured to the connecting bores 24 of circular motion path of the chainring 10, the center of rotation 39 of the crankarm 30 is the same as the chainring center 16 to make the chainring 10 provide a circular path of motion.

In conclusion, a rider may change the path of motion of the chainring 10 to change the torque output of the crankset according to different requirements by changing the connecting arms 34 of the crankarm 30 to be secured to different sets of connecting bores 20, 22, 24.

Figure 7:
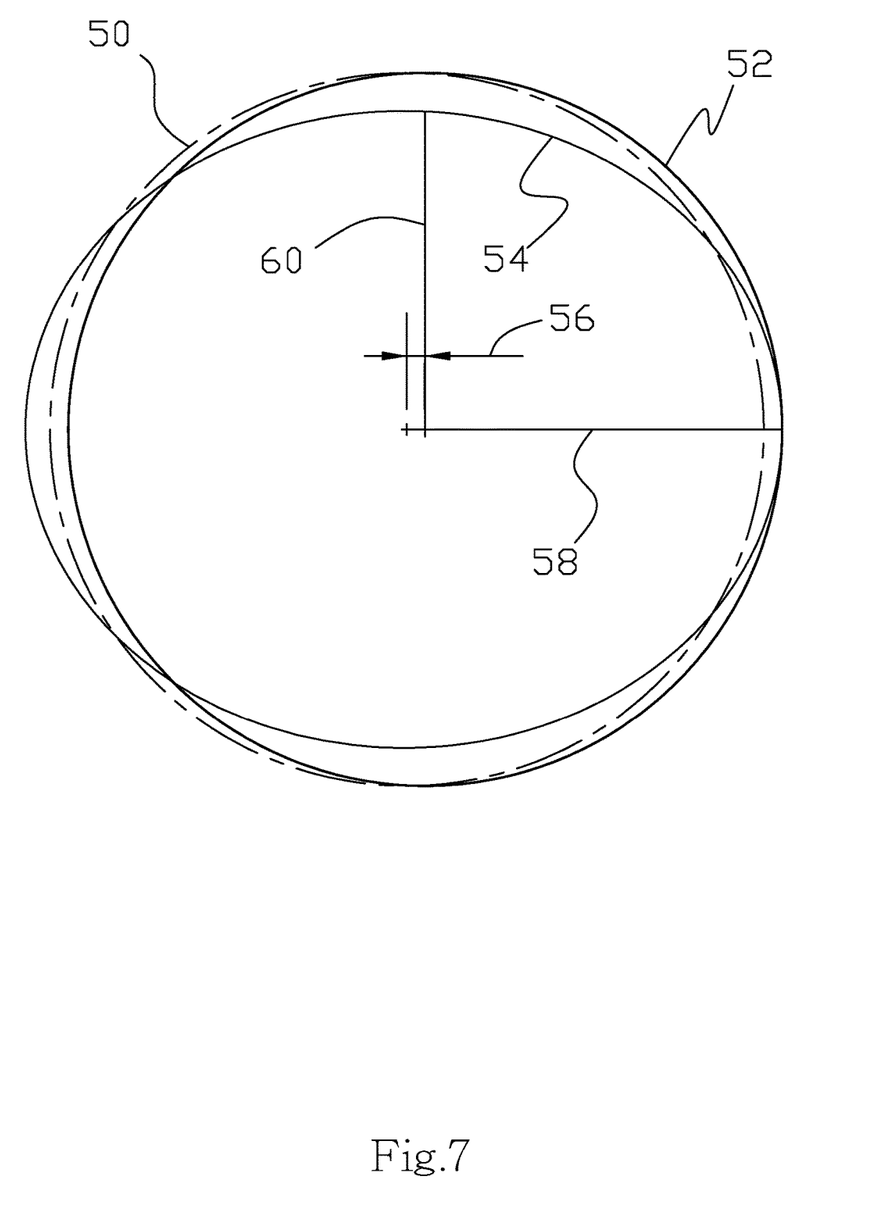
FIG. 7 is a sketch view of the preferred embodiment of the present invention, showing the different paths of motion.

FIG. 7 shows a circular path of motion 50, an eccentric path of motion 52, and an elliptical path of motion 54. The circular path of motion 50 will be changed to the eccentric path of motion 52 when a center of rotation is moved for an eccentric distance 56. The eccentric path of motion 52 is the noncircular path of motion as described above. The eccentric path of motion 52 will change by shifting the center of rotation. Therefore, we can find a location of center of rotation, which provides the eccentric path of motion 52 approaching to the elliptical path of motion 54. A simple way is to adjust the longest distance from the center of rotation of the eccentric path of motion 52 equal to a length 58 of a semi-major axis of the elliptical path of motion 54. This eccentric path of motion 52 will have the similar effect as the elliptical path of motion 54. For example, a desired elliptical path of motion 54 has a farthest position of 53T power, so the eccentric path of motion 52 is adjusted to have a farthest position of 53T power.

In conclusion, the present invention provides the eccentric distance 56 to change the circular path of motion 20 into the eccentric path of motion 52, and uses the eccentric path of motion 52 to simulate the elliptical path of motion 54. Therefore, we may define that the eccentric path of motion 52 has a semi-major axis and a semi-minor axis like the elliptical path of motion 54. A length 58 of the semi-major axis is the longest distance between the center of rotation and the eccentric path of motion 52, and a length 60 of the semi-minor axis is the shortest distance between the center of rotation and the eccentric path of motion 52. A ratio of the length 58 of the semi-major axis and the length 60 of the semi-minor axis is in a range 1.1 and 1.3, and a preferred ratio is 1.215.

Figure 8:
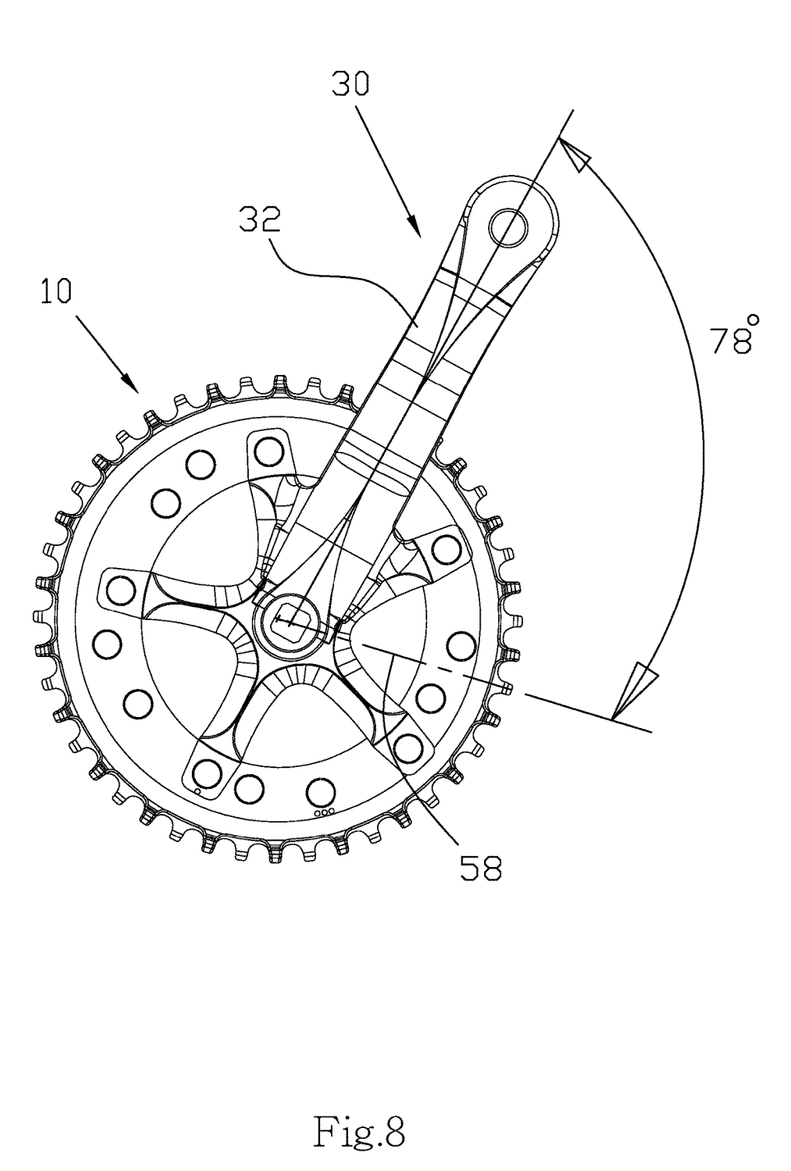
FIG. 8 is a front view of the preferred embodiment of the present invention, showing the included angle between the crankarm and the major axis.
Figure 9:
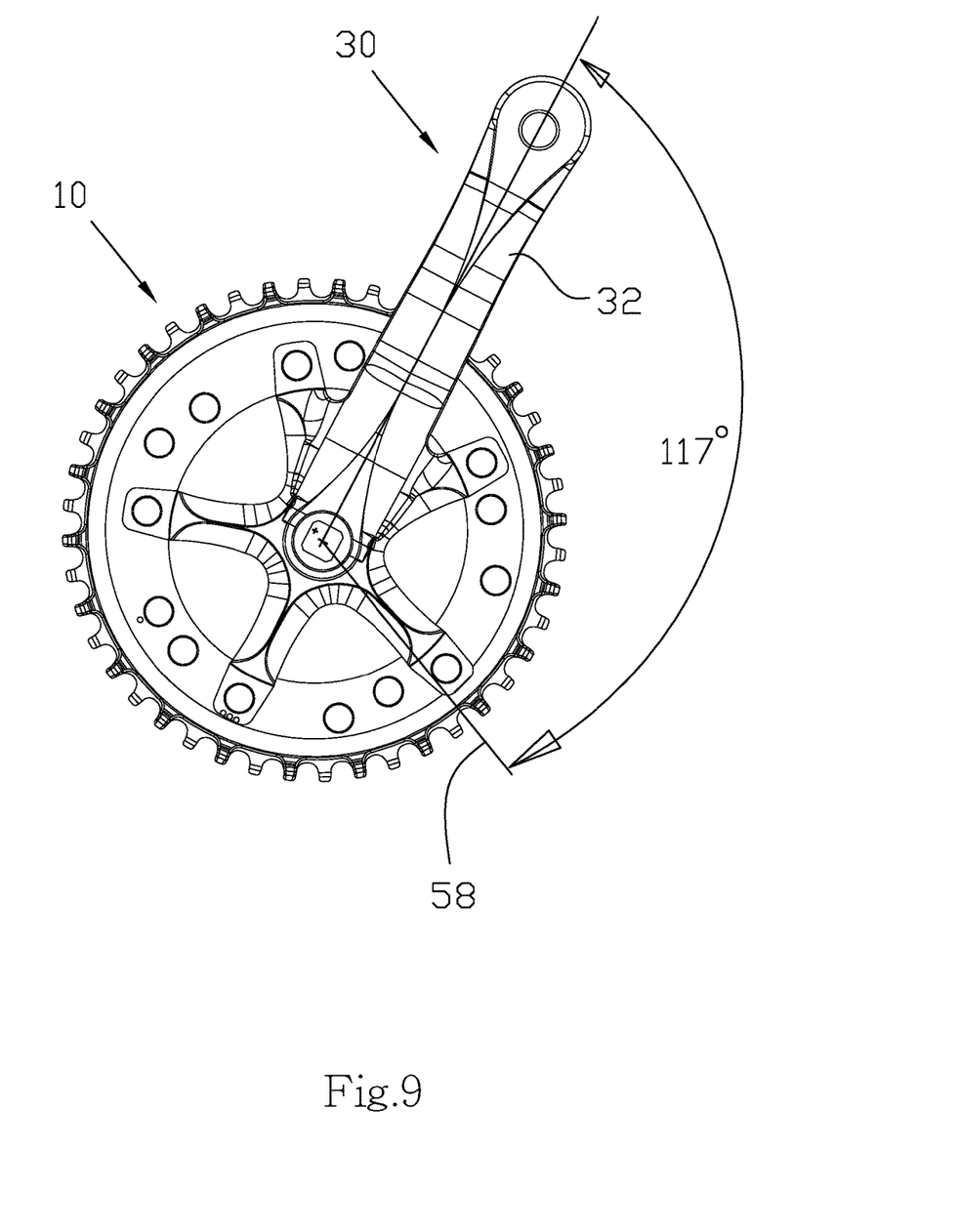
FIG. 9 is a front view of the preferred embodiment of the present invention, showing another included angle between the crankarm and the major axis.

Changing a location of the crankarm 30 secured on the chainring 10 may change a path of moth of the chainring 10, and furthermore, it will change an included angle between the crankarm 30 and the semi-major axis of the path of motion as well. FIG. 8 shows that the crankarm 30 is secured to the connecting bores 20 of first noncircular motion path of the chainring 10, and an included angle between the crankarm 30 and the semi-major axis of the first noncircular path of motion is about 78 degrees. FIG. 9 shows that the crankarm 30 is secured to the connecting bores 22 of second noncircular motion path of the chainring 10, and an included angle between the crankarm 30 and the semi-major axis of the second noncircular path of motion is about 117 degrees.

The present invention set that a ratio of the length 58 of the semi-major axis and the length 60 of the semi-minor axis of the noncircular path of motion is in a range 1.1 and 1.3, and the included angle between the crankarm 30 and the semi-major axis of the noncircular path of motion is in a range between 75 degrees and 120 degrees. It may reduce the loading of the rider's knees. Besides, the eccentric path of motion 52 has a smooth change of radius of curvature to reduce the unbalance condition when the rider is stepping the pedals. Therefore, the present invention may provide various path of motion of the chainring 10 to provide the rider a balance, stable, and efficient cycling.

It must be pointed out that the embodiments described above are only some preferred embodiments of the present invention. All equivalent structures which employ the concepts disclosed in this specification and the appended claims should fall within the scope of the present invention.

What is claimed is:

1. A bicycle crankset, which is adapted to connect to a chain, comprises:
    a chainring having a round circumference and a plurality of teeth on the circumference to engage the chain, wherein the chainring has a chainring center, which is a center of the circumference, and a connecting portion;
    the chainring having a plurality of connecting bores of first noncircular motion path on the connecting portion, wherein the connecting bores of first noncircular motion path have a center of rotation, and the center of rotation of the connecting bores of first noncircular motion path is kept a distance from the chainring center;

the chainring having a plurality of connecting bores of circular motion path on the connecting portion, wherein the connecting bores of circular motion path have a center of rotation, and a location of the center of rotation of the connecting bores of circular motion path is the same as the chairing center; and a crankarm having a plurality of connecting arms at an end thereof, and an axial bore at the end having the connecting arms, wherein the crankarm has a center of rotation at a center of the axial bore, each of the connecting arms has a bore, and distances between center of the bores and the center of rotation of the crankarm are the same;

wherein the connecting arms of the crankarm are selected to be secured to the connecting bores of first noncircular motion path or the connecting bores of circular motion path of the chainring; the chainring provides a first noncircular path of motion when the connecting arms of the crankarm are secured to the connecting bores of first noncircular motion path, and chainring provides a circular path of motion when the connecting arms of the crankarm are secured to the connecting bores of circular motion path.

2. The bicycle crankset of claim 1, wherein the chainring having a plurality of connecting bores of second noncircular motion path on the connecting portion, wherein the connecting bores of second noncircular motion path have a center of rotation, and the center of rotation of the connecting bores of second noncircular motion path is kept a distance from the chainring center, and also kept a distance from the center of rotation of the connecting bores of first noncircular motion path; the chainring provides a second noncircular path of motion when the connecting arms of the crankarm are selected to be secured to the connecting bores of second noncircular motion path.

3. The bicycle crankset of claim 1, wherein a path of the first noncircular path of motion has a semi-major axis and a semi-minor axis, and a ratio of a length of the semi-major axis and a length of the semi-minor axis is in a range 1.1 and 1.3.

4. The bicycle crankset of claim 1, wherein an included angle between the crankarm and a semi-major axis of the first noncircular path of motion is in a range between 75 degrees and 120 degrees.

\* \* \* \* \*